United States Patent [19]

Tetzner

[11] 4,028,825

[45] June 14, 1977

[54] FISH HOOK REMOVER

[76] Inventor: Siegfried K. Tetzner, 5307 W. Lake Shore Drive, Wonder Lake, Ill. 60097

[22] Filed: July 18, 1975

[21] Appl. No.: 597,040

[52] U.S. Cl. .................................................. 43/53.5
[51] Int. Cl.² ........................................ A01K 97/00
[58] Field of Search ............... 43/53.5, 1, 4, 44.91; 7/1 H, 15, 17; 289/17; 81/3 J

[56]  References Cited
UNITED STATES PATENTS

| 2,103,008 | 12/1937 | Kinast | 43/53.5 |
| 3,050,896 | 8/1962 | Parker | 43/53.5 |
| 3,154,879 | 11/1964 | Crooke | 43/53.5 |
| 3,334,437 | 8/1967 | Sawyer | 43/53.5 |

FOREIGN PATENTS OR APPLICATIONS

| 884,521 | 1961 | United Kingdom | 43/53.5 |

*Primary Examiner*—Louis G. Mancene
*Assistant Examiner*—Peter K. Skiff
*Attorney, Agent, or Firm*—Wegner, Stellman, McCord, Wiles & Wood

[57] ABSTRACT

A fish hook remover having a generally helical extractor portion provided with at least one forwardly opening notch for receiving the bight of a hook being removed from a fish. The tool may include a selectively extensible handle portion. The handle may be provided with longitudinal channels for receiving the line and permitting the user to hold the line taut with the hook bight received in the extractor portion notch. The handle may be further provided with an annular recess at the distal end into which a portion of the line may be wrapped to maintain the taut extension of the line during the extracting operation.

14 Claims, 9 Drawing Figures

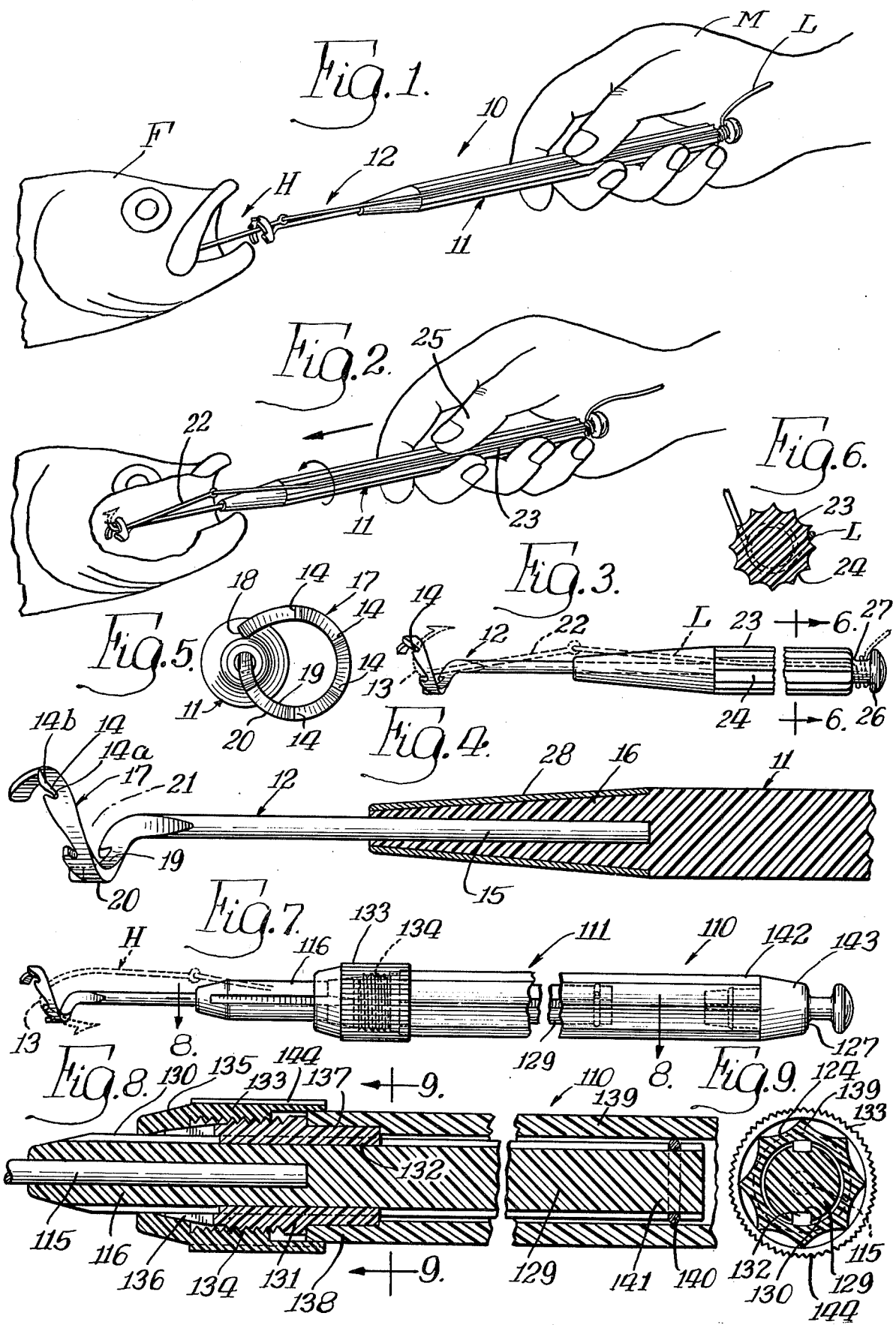

FISH HOOK REMOVER

BACKGROUND OF THE INVENTION

1. Field of the Invention

This invention relates to fish hook removers and in particular to fish hook removers adapted to be inserted into the mouth of the fish, manipulated to engage the bight of the hook therewith, and subsequently manipulated to withdraw the hook from the flesh of the fish and allow its extraction from the fish's mouth while being held in the tool.

2. Description of the Prior Art

In my U.S. Pat. No. 3,713,243, I have shown and claimed an improved tool for removing a barbed hook from a fish. The hook remover tool therein is provided with a cam means for positioning the barbed portion of the hook in a retracted protected position for facilitating withdrawal of the tool and hook from the fish's mouth.

Another fish hook remover having a recess for receiving the barbed hook is that of A. E. Daughtry U.S. Pat. No. 3,377,735.

Other fish hook extractors are illustrated in U.S. Pat. No. 2,586,431 of Paul L. Krichbaum and 2,670,561 of Sydney A. Howorth et al.

Another form of such fish hook disgorger is illustrated in U.S. Pat. No. 3,374,570 of Erwin C. Lenzen, where the tool includes a looped end portion which is suitably manipulated to disengage and hold the hook during the extracting operation.

In U.S. Pat. No. 2,152,898 of Benjamin L. Dorsey, a fish hook disorger is shown having a pair of curved fingers defining therebetween a notch.

In Charles R. Harkins U.S. Pat. No. 2,155,898, a fish hook extractor is shown to comprise a wire device having a convolute, or coil, end adapted to hold the hook during the extracting operation.

Leon H. Underwood, in U.S. Pat. No. 2,441,458, shows a disgorger having a coiled end which is adapted to hold the hook during the extracting operation.

The disgorger tool of Benjamin F. Borup, in U.S. Pat. No. 2,662,331, is generally similar to that of the Harkins and Underwood patents in comprising a coiled, or convoluted, end portion of a wire tool.

David A. Craig in U.S. Pat. No. 2,699,625, shows an extractor which has a double element coiled end portion and a shield at the outer end of the coiled portion.

Charles W. Buller, U.S. Pat. No. 2,897,626, shows a disgorger utilizing a helically grooved member and an opposite spiral end portion.

SUMMARY OF THE INVENTION

The invention comprehends an improved tool for removing from a fish a barbed hook attached to a line wherein a generally helical extractor portion is provided at one end of a handle. The extractor portion is provided with at least one forwardly opening notch for receiving the bight of the hook in the extracting operation.

In the illustrated embodiment, a plurality of such notches are provided substantially equiangularly spaced rearwardly of the distal end of the extractor portion.

The distal end of the extractor portion may be rounded.

The extractor portion may be cylindrical side wall surfaces and may have a helical extent of substantially 360°.

The handle portion of the tool may define a plurality of segmentally cylindrical, longitudinal channels for receiving the line during the extracting operation.

In one form, the handle may be longitudinally extensible for facilitated use of the tool with different size fish. Means may be provided for locking the handle in any one of a plurality of different extension arrangements.

To facilitate maintaining the line taut with the bight of the hook end in the extractor portion notch, the handle may be provided at its distal end with an annular groove into which the line may be wrapped.

The hool removing tool of the present invention is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein:

FIG. 1 is a fragmentary perspective view of a fish hook remover embodying the invention in an initial step in the removal of the fish hook from a fish;

FIG. 2 is a fragmentary perspective view thereof illustrating a second step in the removal operation;

FIG. 3 is a broken side elevation of the hook remover tool with the hook bight received in one of the extractor portion notches as during a further step in the hook removing operation;

FIG. 4 is a fragmentary enlarged diametric section of the tool;

FIG. 5 is a lefthand end view thereof;

FIG. 6 is an enlarged transverse section taken substantially along the line 6—6 of FIG. 3;

FIG. 7 is a broken side elevation of a modified form of the tool illustrating means for adjusting the extension of the handle;

FIG. 8 is a fragmentary enlarged diametric section thereof taken substantially along the line 8—8 of FIG 7; and FIG. 9 is a transverse section taken substantially along the line 9—9 of FIG. 8.

DESCRIPTION OF THE PREFERRED EMBODIMENTS

In the exemplary embodiment of the invention as disclosed in FIGS. 1-6 of the drawing, a tool generally designated 10 for removing from a fish F a barbed hook H attached to a line L is shown to comprise a handle portion 11 and an extractor portion generally designated 12. The handle portion is adapted to be manipulated by the user's hand M by urging the extractor portion into the fish's mouth to abut the bight 13 of the hook H with the line extending tautly outwardly from the fish's mouth. Rotation of the extractor portion, as shown in FIG. 2, is effected to cause bight 13 to move into any one of a plurality of notches 14 on extractor portion 12 whereby the hook is firmly held by the extractor portion permitting it to be extracted from the flesh in which it is embedded and withdrawn from the fish's mouth with the user's hand remaining at a safe distance from the fish's mouth at all times during the hook extracting operation.

As best seen in FIGS. 4 and 5, extractor portion 12 includes a shank 15 secured in the forward end 16 of handle portion 11 to extend forwardly therefrom. The forward end of the extractor portion is defined by a helical portion 17 which, as shown in FIG. 5 extends approximately 360° about the helical axis. In the illustrated embodiment, the helical portion is provided with four substantially equiangularly spaced notches 14 which open forwardly to receive the hook bight, as illustrated in FIG. 3. As shown, the first notch is spaced at least 60° about the helical axis from the distal end 18 of the extractor potion 17 may be rounded, as shown in FIG. 5 and. The radially inner surface 19 and radially outer surface 20 of portion 17 comprise cylindrical surfaces, as best seen in FIGS. 4 and 5.

Each notch 14 is defined by a rearward stop surface 14a extending generally parallel to the axis 21 of the helical extractor portion 17, and a forward guide surface 14b extending at a small angle to the helical extent thereof. Guide surface 17b is adapted to guide the hook bight 13 into abutment with the stop surface 14a as an incident of manipulation of the handle rotatively about axis 21, as shown in FIG. 2, with the extractor portion urged forwardly against the bight and generally coaxially of the shank 22 of the hook, as shown in FIGS. 2 and 3, during the hook extracting operation.

Stop surfaces 14a may be undercut for improved retention of the hook.

For facilitated maintenance of the line taut during the extracting operation, the grasping portion 23 of handle portion 11 may be provided with a plurality of longitudinally extending channels 24 adapted to receive the line, as illustrated in FIGS. 2 and 6. With the line thus received in the channel, the user may place his thumb 25 against the line, as illustrated in FIG. 2, to maintain the desired tautness during the extracting operation.

To further retain the line taut, a winding arbor portion 26 may be provided defined by an annular channel 27 into which the line may be wound. The winding arbor 26 may be provided at the end of the handle remote from extractor portion 12.

As illustrated in FIG. 4, the extractor portion may be formed of a metal rod and the handle portion may comprise a synthetic resin molding. A decorative ferrule 28 may be provided on the nose portion 16, as desired.

For further facilitated fish hook extraction, the handle may comprise an extensible handle generally designated 111, as shown in FIGS. 7 and 8. Thus, in the fish hook extracting tool 110 illustrated therein, the handle may include a core 129 having a forward end 116 in which the extractor portion 115 is coaxially secured. Core portion 116 is provided with a plurality of slots 130. A tubular gripper 131 is slidably mounted on the core portion and provided with a plurality of radially inwardly projecting keys 132 received in the slots for preventing rotational movement of the gripper about the core while permitting ready longitudinal movement thereof relative to the core.

A clamp ring 133 is threadedly secured to the gripper 131 by suitable threaded means 134 and includes a nose portion 135 engaging a tapered nose portion 136 on the gripper 131 for locking the gripper to the core 129 upon threaded tightening of the clamp ring 133 on the gripper 131.

Gripper 131 includes an outer portion 137 fixedly secured in the forward end 138 of a tubular shell 139 coaxially surrounding the core 129 and slidably mounted at its outer end to the core by an O-ring 140 carried on an outer end 141 of the core. The rearward end 142 of the shell is provided with a cap 143 which defines the annular channel 127 into which the line may be wrapped for retaining the line taut during the extracting operation.

As best seen in FIGS. 7 and 9, clamp ring 133 defines an outer serrated gripping surface 144 and shell 139 defines a plurality of longitudinally extending, segmentally cylindrical channels 124.

The use of tool 110 is similar to the use of tool 10 in extracting a fish hook from a fish's mouth except that the length of the handle may be suitably adjusted for the size of the fish by simply loosening the clamp ring 133, disposing the core 129 in the desired extended relationship to the shell 139, and re-tightening the clamp ring by a suitable threading thereof on threaded means 134. As illustrated in FIG. 7, the core may have a length substantially equal to the length of the shell and, thus, an approximately two-to-one range of ajustment may be provided in the length of the handle, as desired. In extracting the hook, the line may be retained in a channel 124 of the shell in the same manner as in a channel 24 of the handle of tool 10 and an outer portion of the line may be wrapped in the annular channel 127 of cap 143 in the same manner as the line is wrapped in channel 27 of tool 10. The extractor portion of the tool 110 may be substantially similar to that of tool 10 and, thus, tool 110 functions in substantially the same manner as tool 10 while providing facilitated hook extraction with a wide range of fish sizes.

The foregoing disclosure of specific embodiments is illustrative of the broad inventive concepts comprehended by the invention.

I claim:

1. A tool for removing from a fish a barbed hook attached to line, comprising: means defining a handle portion; and a generally helical extractor portion extending axially forwardly from one end of said handle, said extractor portion having a forward helical surface defining a distal end and a forwardly opening notch integrally formed in said extractor portion surface adjacent said distal end for receiving the bight of a hook being removed from a fish, said notch being defined by a helically rearward stop surface extending generally parallel to the axis of the extractor portion and a forward guide surface extending at a small angle to the helical extent of the extractor portion forward helical surface for guiding the hook bight into abutment with said stop surface as an incident of manipulation of the handle rotatively about said axis with the extractor portion urged forwardly against the bight and coaxially of the shank of the hook being removed from the fish.

2. A tool for removing from a fish a barbed hook attached to a line, comprising: means defining a handle portion; and a generally helical extrator portion extending axially forwardly from one end of said handle, said extractor portion having a forward helical surface defining a distal end and a forwardly opening notch integrally forced in said extractor portion surface adjacent said distal end for receiving the bight of a hook being removed from a fish and at least one additional notch in said extractor portion surface helically from said first named notch.

3. The fish hook removing tool of claim 2 wherein said notch is spaced at least approximately 60° about the helical axis from said distal end of the extractor portion.

4. The fish removing tool of claim 2 wherein said handle portion defines an annular groove spaced from end portion into which said line may be wrapped to lock the line taut.

5. The fish hook removing tool of claim 2 wherein a plurality of such additional notches is provided in said extractor portion forward surface at substantially equi-angularly helically spaced positions rearwardly of said first named notch.

6. The fish hook removing tool of claim 2 wherein said extractor portion defines cylindrical radially inner and outer surfaces.

7. The fish hook removing tool of claim 2 wherein said notch is defined in part by a helically rearward stop surface extending generally prallel to to the axis of the extractor portion.

8. The fish hook removing tool of claim 2 wherein said distal end is rounded.

9. The fish hook removing tool of claim 2 wherein said extractor portion comprises an integral extension of said handle portion.

10. The fish hook removing tool of claim 2 wherein said helical extractor portion forward surface approximately 360° about the axis thereof.

11. The fish hook removing tool of claim wherein said handle portion comprises an elongated structure defining a plurality of segmentally cylindrical longitudinal channels in the outer surface thereof for receiving the line during a hook extracting operation.

12. The fish hook remover of claim 2 wherein said handle portion includes an end portion fixedly carrying said extractor portion and a grasping portion longitudinally movable relative to said end portion against which the line may be held taut with the hook held by an extractor portion notch; and means for locking the handle end portion in any one of a plurality of different extension arrangements relative to said grasping portion.

13. The fish hook removing tool of claim 12 wherein said means for locking the handle in any one of a plurality of different extension arrangement comprises threaded means.

14. The fish hook removing tool of claim 2 wherein said handle portion defines a plurality of segmentally cylindrical longitudinal channels in the outer surface thereof for receiving the line durin a hook extracting operation.

* * * * *